United States Patent
Fujiwara

(10) Patent No.: US 6,636,881 B1
(45) Date of Patent: Oct. 21, 2003

(54) BINARY DATA COUNTER, AREA INFORMATION EXTRACTOR AND HUFFMAN CONVERTER

(75) Inventor: Mikio Fujiwara, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/601,799
(22) PCT Filed: Jan. 13, 2000
(86) PCT No.: PCT/JP00/00143
§ 371 (c)(1), (2), (4) Date: Aug. 8, 2000
(87) PCT Pub. No.: WO00/42523
PCT Pub. Date: Jul. 20, 2000

(30) Foreign Application Priority Data

Jan. 18, 1999 (JP) .......................................... 11-009569

(51) Int. Cl.[7] ................................................ G06F 7/00
(52) U.S. Cl. ..................................................... 708/210
(58) Field of Search ............................... 708/210, 211; 377/33

(56) References Cited

U.S. PATENT DOCUMENTS 4,607,176 A * 8/1986 Burrows et al. ............... 377/33
5,541,865 A * 7/1996 Ashkenazi ................... 708/210
5,734,599 A * 3/1998 Lee et al. .................... 708/620

FOREIGN PATENT DOCUMENTS

| JP | 4276872 | 10/1992 |
|---|---|---|
| JP | 8263653 | 10/1996 |

* cited by examiner

Primary Examiner—Chuong Dinh Ngo
(74) Attorney, Agent, or Firm—Stevens, Davis, Miller & Mosher, LLP

(57) ABSTRACT

In order to provide an inexpensive binary data counting device of which the processing is done at high speed and which can be implemented with a small circuit scale, a shifter array 10 is provided for outputting binary data of N bits, which comprises N×(N+1)/2 shifters of which the control inputs are the data expressed in a binary manner comprising N bits so that binary data wherein is are filled in from the right in the same number as 1s in the data expressed in a binary manner comprising N bits are outputted by controlling the operation of each shifter in the shifter array 10 with each bit value of the data expressed in a binary manner comprising N bits. An encoder is also provided for converting said binary data into a multi-valued number in accordance with the position of 1 in said binary data on the MSB side.

8 Claims, 8 Drawing Sheets

FIG. 2 (a)
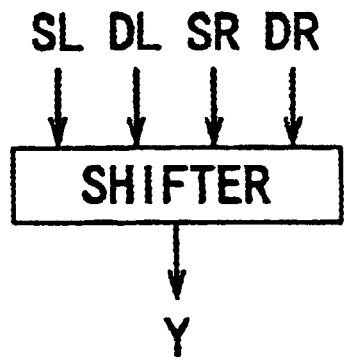
FIG. 2 (b)
| OPERATION | SL | SR | Y |
|---|---|---|---|
| SHIFT | 0 | 1 | DR→Y |
| THROUGH | 1 | 0 | DL→Y |
FIG. 2 (c)
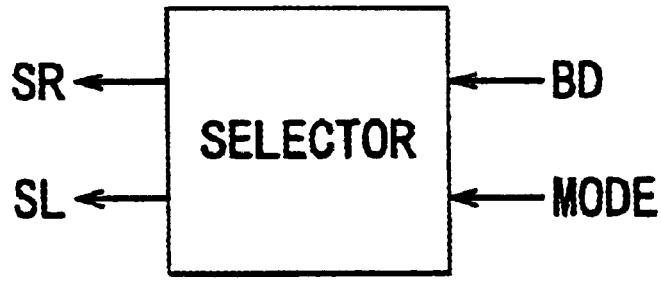
FIG. 2 (d)
| MODE | SR | SL |
|---|---|---|
| 0 | *BD→SR | BD→SL |
| 1 | BD→SR | *BD→SL |

BINARY DATA COUNTER, AREA INFORMATION EXTRACTOR AND HUFFMAN CONVERTER

TECHNICAL FIELD

This invention relates to a binary data counting device used in a process, such as a Hough transform, for area sampling or line sampling in a pattern recognition device or the like of FA (Factory Automation) equipment, in particular to an area information sampling device or a Hough transform device which are application devices of the binary data counting device.

In the above described process of area sampling, a binary data counting device is used for the process of counting the number of "1s" in the binary image in order to sample the area of the "1s" (for example, black) region in a binary image (for example, the background is "0" (for example, white)).

It also is used, in the process of Hough transform, in a process of counting the number of "1s" (for example, black) which exist in a particular Japanese hand drum shaped region in a binary image (for example, the background is "0" (for example, white)).

BACKGROUND ART

Conventionally there are two major methods of counting the number of "1s" or "0s" in the data expressed in a binary manner comprising N (N is an integer of 2 or more) bits so as to take out the counting result as multi-valued data. Here, the data expressed in a binary manner comprising N bits can also be expressed as binary data of N bit length.

One is the method where data are set in a register of N bits, 1 bit is shifted to the left at an ALU (Arithmetic and Logic Unit), the value of the bit of the MSB (Most Significant Bit) is set for carrying and, in the case when the value is the desired value, the value of the accumulator is incremented by 1. This method can be implemented easily with software for the MCU (Micro Controller Unit) or the DSP (Digital Signal Processor).

That requires three instructions for the processing of 1 bit, however, which has defect that the processing speed is slow. In practical image processing, the processing object tends to be large, for example, 10,000 pixels by 10,000 pixels and, therefore, it is desirable that at least N bits are processed for one instruction implementation period. Accordingly, there is a method of using a dedicated circuit of hardware as another means.

An example of the method for implementation with hardware is described with reference to FIG. 6. FIG. 6 shows, in the case of N=16, a configuration of the case where the number of "1s" is counted. First, with respect to data BDATA 15 to BDATA 0, which are expressed in a binary manner and comprise 16 bits, every neighboring two bits are paired from the side of the LSB (Least Significant Bit) to make eight pairs in total. Then, those eight pairs are inputted into eight 1-bit adders AD18 to AD11, respectively, to perform the addition. As a result of this eight pieces of 2-bit data are formed.

Next, in the same way as above, with respect to eight pieces of 2-bit data outputted, respectively, from the 1-bit adders AD18 to AD11, every neighboring two pieces are paired from the side of the LSB to make four pairs in total. Then, those four pairs are inputted, respectively, into four 2-bit adders AD24 to AD21 to perform the addition. As a result of this four pieces of 3-bit data are formed.

Next, in the same way as the above, with respect to four pieces of 3-bit data outputted, respectively, from the 2-bit adders AD24 to AD21, every neighboring two pieces are paired from the side of the LSB to make two pairs in total. Then, those two pairs are, respectively, inputted into the two 3-bit adders AD32 and AD31 to perform the addition. As a result of this two pieces of 4-bit data are formed.

Next, those two pieces of 4-bit data are inputted into the 4-bit adder AD41 to perform the addition. As a result of this one piece of 5-bit data which corresponds to the number of "1s" in the data expressed in a binary system comprising sixteen bits is formed. That is to say, multi-valuing of the data expressed in a binary manner comprising sixteen bits is completed.

As described above, a counting device can be implemented by forming a network of adders.

On the contrary, in the case of N=16, fifteen adders in total are necessary, which are: 1-bit adder×16/2+2-bit adder×16/4+3-bit adder×16/8+4-bit adder×16/16. In addition, in the case of N=32, thirty one adders in total are necessary, which are: 1-bit adder×32/2+2-bit adder×32/4+3-bit adder×32/8+4-bit adder×32/16+5-bit adder×32/32. Accordingly, as hardware, not only the number of adders is enormous but also each of the adders themselves becomes complicated in the circuit configuration as the bit number increases, which leads to a large scale circuit as a whole.

As described in the above conventional examples there are the defects that though the former has a smaller circuit scale the process speed is too slow to be practical and though the latter is fast in the process speed compared to the former the circuit scale becomes large.

DISCLOSURE OF INVENTION

The purpose of the present invention is to provide a binary data counting device, an area information sampling device and a Hough transform device of which the processing speed is high and which can be implemented with a small circuit scale and at low cost.

A binary data counting device according to the first aspect of the invention counts the number of either one of the binary digit in the data expressed in a binary manner comprising N bits, which is provided with a shifter array for outputting the binary data of N bits. The shifter array comprises N×(N+1)/2 shifters of which the control input is each bit value of the data expressed in a binary manner comprising N bits.

N×(N+1)/2 shifters are mutually connected so that the binary data of N bits are outputted under the condition where one of the binary digits is filled in from one side in the same number as either one of the binary digits in the data expressed in a binary manner comprising N bits by controlling the operation of each shifter making up the shifter array with each bit value of the data expressed in a binary manner comprising N bits.

According to this configuration, the number of either one of the binary digits in the data expressed in a binary manner comprising N bits is counted and in the case of transform to a multi-valued numerical expression such as a decimal number or a hexadecimal number, the number of either one of the binary digits in the data expressed in a binary manner comprising N bits is not counted through a direct operation but the counting process of the binary data is implemented as in the following. That is to say, the binary data of N bits are outputted under the condition where the same number of one of the binary digits as the number of either one of the binary digits in the data expressed in a binary manner comprising N bits is filled in from one side by controlling the operation of each shifter making up the shifter array with each bit value of the data expressed in a binary manner comprising N bits.

That is to say, the process of counting the number of "1s" or "0s" in the data expressed in a binary manner comprising N bits is implemented by expressing binary data when filled in from, for example, the right side so as to be able to intentionally encode the number of "1s" or "0s" which are desired to be counted in the data expressed in a binary manner comprising N bits. In this case, it is possible that the operation of the shifter array can be completed with one clock and the circuit scale is much smaller in comparison to the adder. Accordingly, compared to a conventional example, the process of counting the number of "1s" or "0s" in the data expressed in a binary manner can be implemented with the processing speed being higher and the circuit scale being smaller so that an inexpensive binary data counting device can be provided. In addition, it is possible that the shift operation can be performed in a shorter span of time compared to the process of a multi-bit addition operation and, therefore, a process of higher speed than that of the circuit configuration by the network configuration of the adders becomes possible.

In the configuration of the above described first aspect of the invention, an encoder maybe provided which converts binary data outputted from the shifter array under the condition where one of the binary digits is filled in from one side to a multi-valued number in accordance with the position of one of the binary digits on the side of the MSB.

According to this configuration, the same effects as the configuration of the above described first aspect of the invention can be gained since the process of counting the number of either one of the binary digits in the data expressed in a binary manner comprising N bits is implemented by multi-valuing the binary data outputted from the shifter array in accordance with the position of either one of the binary digits on the side of the MSB by using the encoder.

In the configuration of the above described first aspect of the invention, a selection means can be provided for selectively designating either one of the binary digits in the data expressed in a binary manner comprising N bits for counting.

According to this configuration, the same effects as the configuration of the above described first aspect of the invention can be gained.

A binary data counting device according to the second aspect of the invention is to count the number of either one of the binary digits in the data expressed in a binary manner comprising N bits, which is provided with N bits flip-flop and a shifter array.

The N flip-flops have each bit value of the data expressed in a binary manner comprising N bits as respective input.

In the shifter array, N×(N+1)/2 shifters with two inputs and one output are arranged in a triangle shape of N rows with a diagonal part of the arrangement in an N×N matrix as an oblique side and with two side parts arranged in a matrix shape as the base and a perpendicular side, respectively, each of the outputs of the N flip-flops are control signals of the shifter for each row comprising the triangle shape and the output of the N shifters in the Nth row arranged on the base of the triangle shape are outputted as a binary data of N bits.

Then, when two inputs of the shifter are assumed as the first and the second inputs, whether the first input is outputted or the second input is outputted is selected as the output of the shifter by the control signal. One of the binary values is inputted to the first input of the shifter arranged on the oblique side part in the triangle shape and the output of the shifter belonging to the oblique side part of the front row is inputted into the second inputs of the shifters from the second row to the Nth row of the oblique side part. The other binary value is inputted into the second input of the shifter arranged along the perpendicular part of the triangle shape and the output of the shifter belonging to the vertical side part at the front row is inputted into the first inputs of the shifters from the second row to the Nth row of the perpendicular side parts. In addition, the output of the shifter in the same column of the front row is inputted into the first input of the shifter arranged in other areas than the oblique side part or the perpendicular side part of the triangle shape, and the output of the shifter arranged on the perpendicular side next to the shifter of the same column at the front row is inputted into the second input.

According to this configuration, the same effects as the configuration of the above described first aspect of the invention can be gained.

In the configuration of the above described second aspect of the invention, an encoder may be provided which converts the binary data of N bits outputted from the shifter array into a value gained by counting the number of either one of the binary digits of the data expressed in a binary manner.

According to this configuration, the same effects as the above described first aspect of the invention can be gained.

In the configuration of the above described second aspect of the invention, a selection means can also be provided which selectively designates either one of the binary digits in the data expressed in a binary manner comprising N bits for counting by switching between the conditions where the outputs of the N flip-flops are used without inversion as control signals of the shifter and the condition where the outputs of N flip-flops are inverted to be used as the control signal of the shifter.

According to this configuration, the same effects as the above described first aspect of the invention can be gained.

An area information sampling device according to the third aspect of the invention is the application of the binary data counting device according to the first aspect of the invention.

According to this configuration, the same effects as the binary data counting device according to the first aspect of the invention can be gained.

A Hough transform device according to the fourth aspect of the invention is the application of the binary data counting device according to the first aspect of the invention.

According to this configuration, the same effects as the binary data counting device according to the first aspect of the invention can be gained.

BRIEF DESCRIPTION OF DRAWINGS

FIG. 2($a$) is an exemplary diagram for the shifter, FIG. 2($b$) is the operation diagram thereof, FIG. 2($c$) is an exemplary diagram for the selector and FIG. 2($d$) is the operation diagram thereof;

BEST MODE FOR CARRYING OUT THE INVENTION

In the following a binary data counting device of the embodiment according to the present invention is described in reference to FIGS. 1 to 3 and FIGS. 7 and 8.

Figure 1:
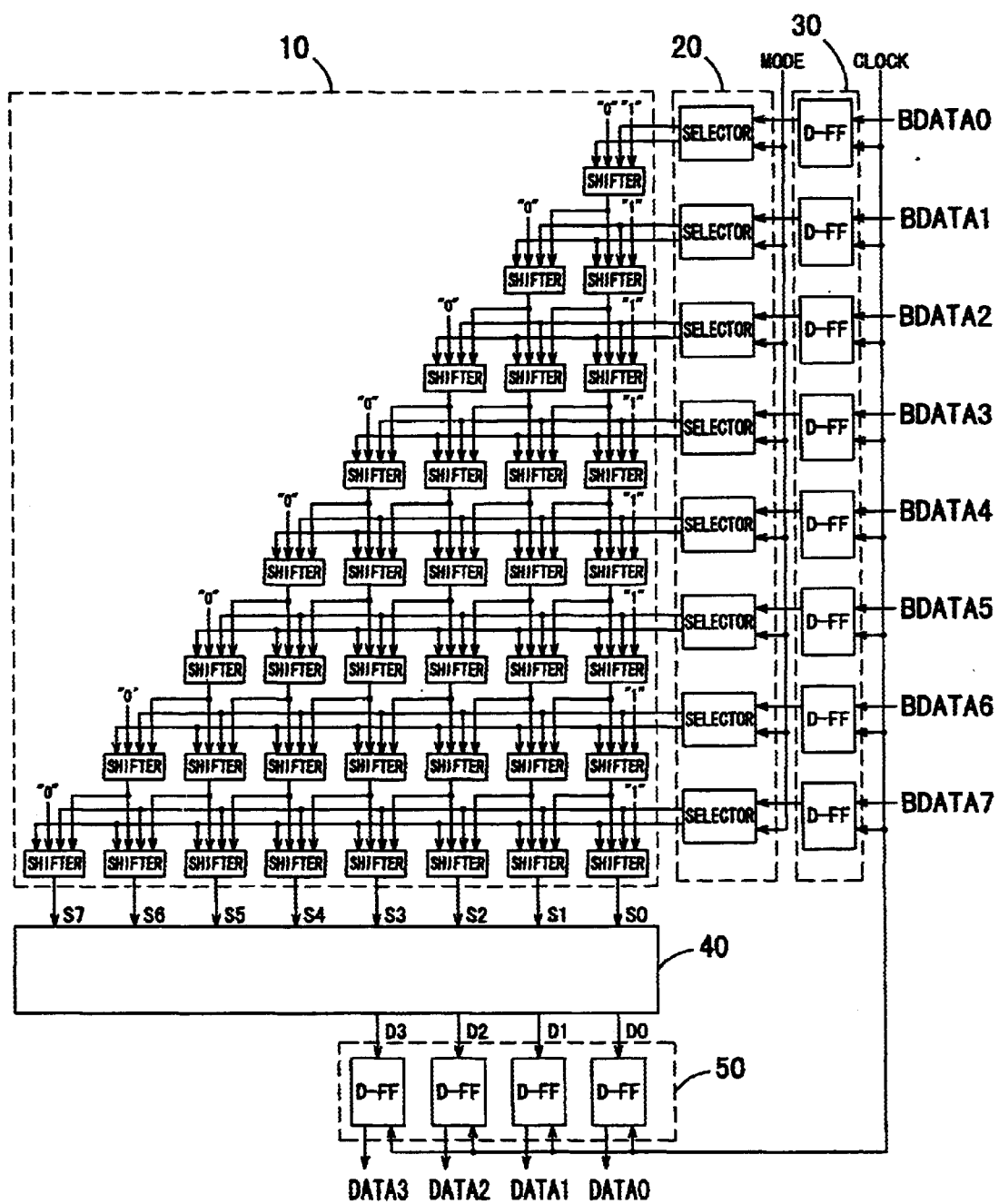
FIG. 1 is a block diagram showing a configuration of the binary data counting device in the case of N=8 in the embodiment of the present invention.

FIG. 1 shows a binary data counting device in the case of N=8 for a simplified description in the embodiment of the present invention.

In FIG. 1, the shifter array 10 is an array formed of 36(=8×(8+1)/2) shifters with two inputs and one output, and the shifters being used have the control inputs of (SL, SR) as shown in FIG. 2(a), each of which are represented as the exclusive logic so that, when SL=1 and SR=0, the value of the input DL is set as an output Y through a through operation and when SL=0 and SR=1 the value of the input DR is set as an output Y through a shift operation. This is expressed in a formula as shown in formula 1.

Y=DL (through) when SL=1 and SR=0

Y=DR (shift) when SL=0 and SR=1 (Formula 1)

Figure 7:
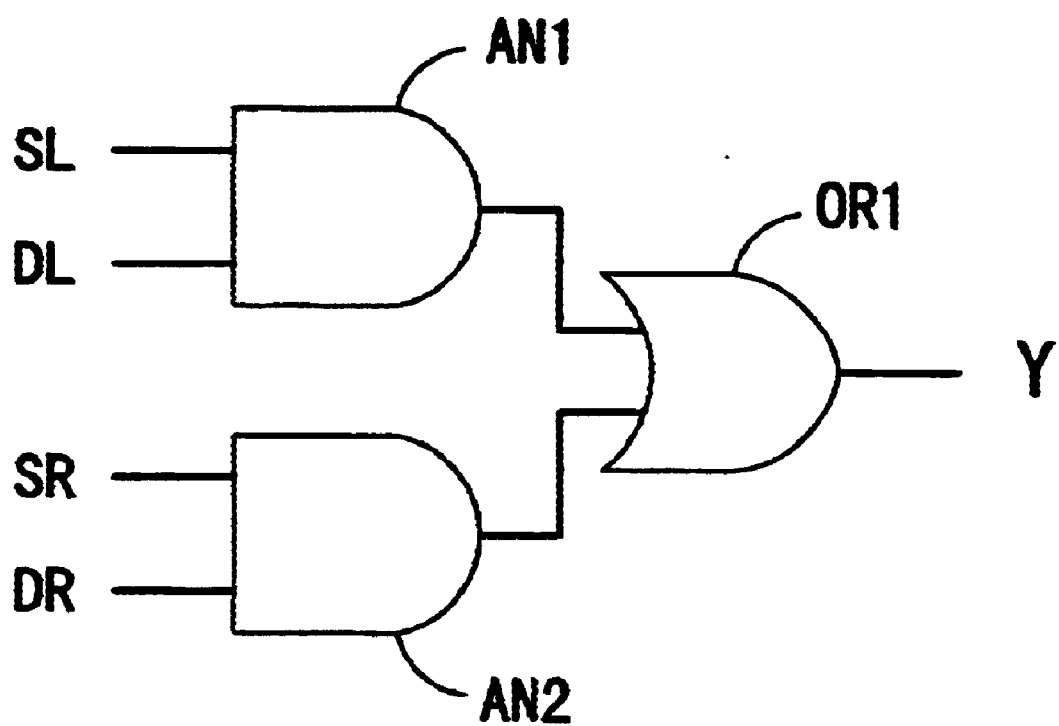
FIG. 7 is a circuit diagram showing a configuration of the shifter.

The one as shown in FIG. 7, for example, can be considered as a concrete circuit configuration. In FIG. 7 symbols AN1, AN2 show AND circuits and symbol OR1 shows an OR circuit. It is also possible to express the above described shifter as a selector for selectively outputting either one of the inputs DL or DR in accordance with the conditions of the control inputs SL, SR. It is also possible to make up the shifters using pass transistors instead of the above described logic circuits. The circuit configuration, being smaller in circuit scale than a full adder, is much smaller in circuit scale, for example of a magnitude of approximately one several tenths, compared to an adder of multi-bits, of which the time necessary for shift processing can be shortened compared to an addition operation of multi-bits according to a prior art and, therefore, it becomes possible to shorten the setting of the time for one clock which makes possible higher speed processing.

Next, eight selectors 20 are set so as to count the number of "1s" when MODE=1 and to count the number of "0s" when MODE=0 in a circuit for selecting either value of "0" or "1" of the binary data BD is to be counted by a MODE signal. This relationship can be expressed in a formula as shown in formula 2.

SR=*BD, SL=BD when MODE=0

Figure 8:
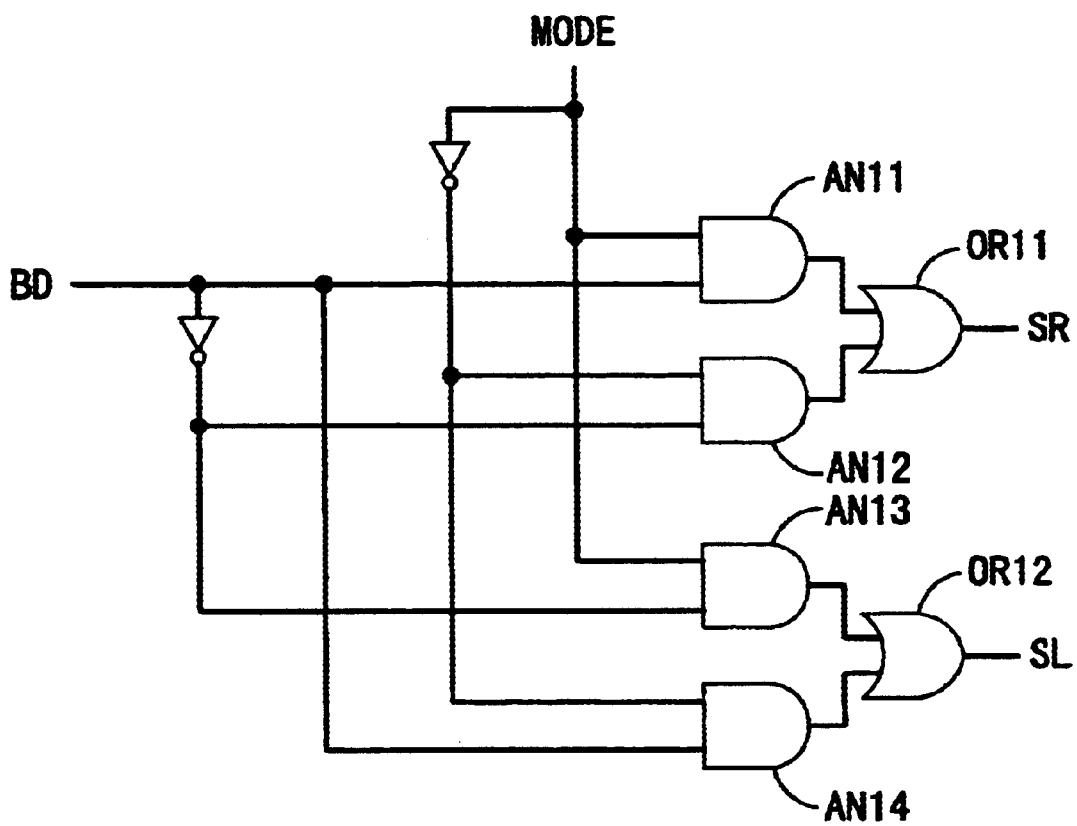
FIG. 8 is a circuit diagram showing a configuration of the selector.

SR=BD, SL=*BD when MODE=1 (Formula 2)

Wherein the symbol * means an inversion. As a concrete circuit configuration, for example the one as shown in FIG. 8 can be considered. In FIG. 8, symbols AN11 to AN14 show AND circuits and symbols OR11 and OR12 show OR circuits.

Next, eight D flip-flops (hereinafter referred to as D-FFs) 30 are data registers which synchronize with the clock signal CLOCK to input binary data of 8 bits (data expressed in a binary manner comprising 8 bits) BDATA [7:0]. The output of each D-FF30 is given to each selector 20 as the binary data BD.

8 bit signal (binary data) S [7:0] outputted from the shifter array 10 expresses, in the number of "1s" filled in from the right, the number of desirable values (either one of "1" or "0") designated by the MODE signal in the input signal BDATA [7:0]. When this signal S [7:0] is inputted into the encoder 40, encoding is carried out for the output of 4 bits D [3:0] while concentrating on the position of "1" of S [7:0] on the side of the MSB as shown in the table of truth value of the encoder 40 in Table 1. This output D [3:0] is taken into the four D-FFs 50 by the next clock signal CLOCK so as to be utilized as multi-valued data DATA [3:0].

Here, in the above description "1s" are arranged to be filled in from the right, which may be filled in from the left, and the encoder 40 may be designed in accordance with the direction. Instead of "1s," "0s" may be arranged to be filled in from the right or from the left, and encoding may be carried out concentrating on the position of "0" on the side of the MSB. The above described encoder 40 can be made up of a ROM table having the inputs in Table 1 as addresses and the outputs corresponding the inputs in Table 1 as the data to be written in the addresses, or logic circuits implementing the relationships between inputs and outputs gained by logically compressing the table of truth value of Table 1.

TABLE 1

Table of Truth Value
wherein x is arbitrary (0 or 1)

| Input | | | | | | | | Output | | | |
|---|---|---|---|---|---|---|---|---|---|---|---|
| S7 | S6 | S5 | S4 | S3 | S2 | S1 | S0 | D3 | D2 | D1 | D0 |
| 0 | 0 | 0 | 0 | 0 | 0 | 0 | 0 | 0 | 0 | 0 | 0 |
| 0 | 0 | 0 | 0 | 0 | 0 | 0 | 1 | 0 | 0 | 0 | 1 |
| 0 | 0 | 0 | 0 | 0 | 0 | 1 | X | 0 | 0 | 1 | 0 |
| 0 | 0 | 0 | 0 | 0 | 1 | X | X | 0 | 0 | 1 | 1 |
| 0 | 0 | 0 | 0 | 1 | X | X | X | 0 | 1 | 0 | 0 |
| 0 | 0 | 0 | 1 | X | X | X | X | 0 | 1 | 0 | 1 |
| 0 | 0 | 1 | X | X | X | X | X | 0 | 1 | 1 | 0 |
| 0 | 1 | X | X | X | X | X | X | 0 | 1 | 1 | 1 |
| 1 | X | X | X | X | X | X | X | 1 | 0 | 0 | 0 |

Next, the circuit operation of FIG. 1 is described using actual data examples.

Figure 3:
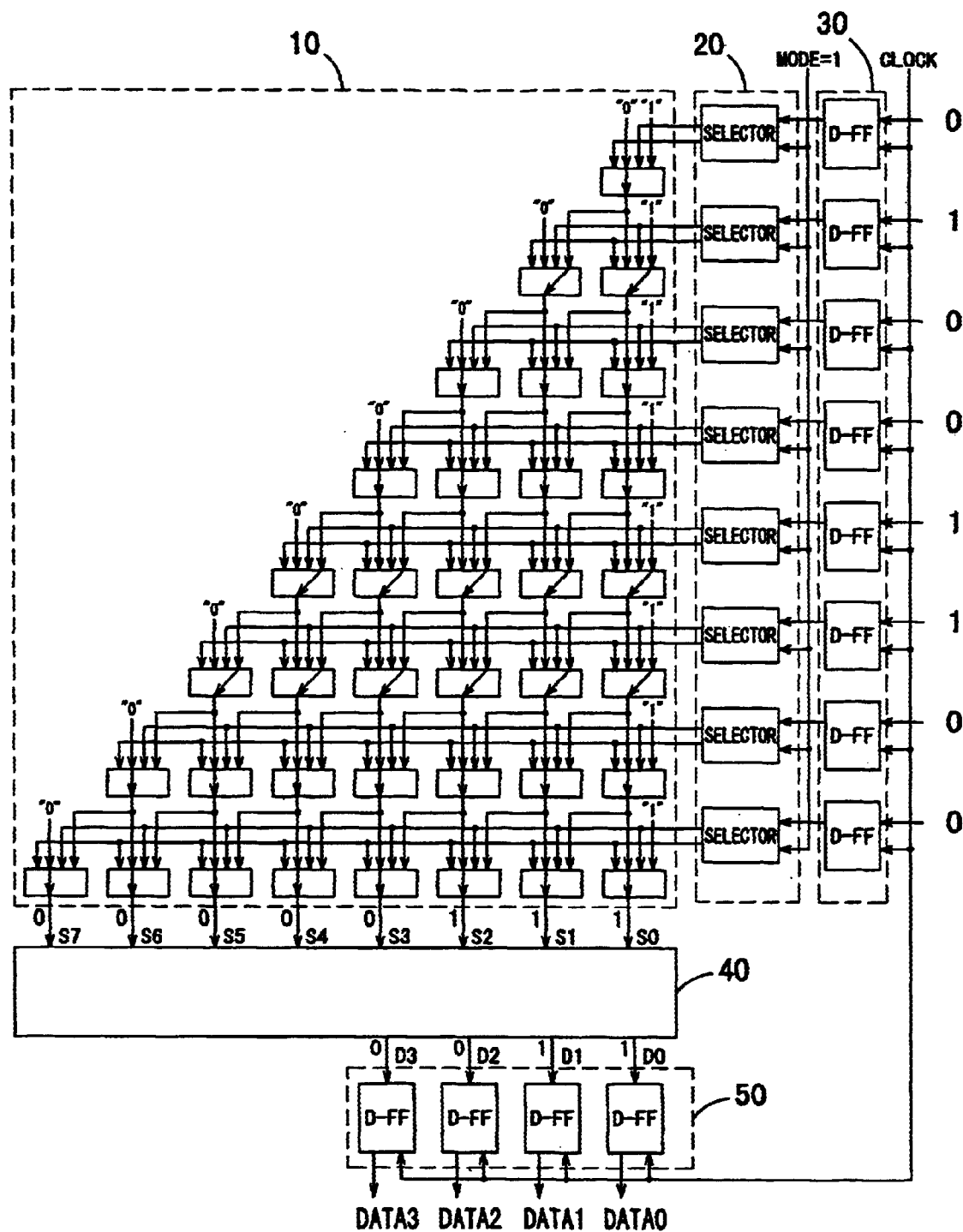
FIG. 3 is an exemplary diagram of FIG. 1 showing a processing example in the case of MODE=1, BDATA[7:0]= (0,0,1,1,0,0,1,0)

Now, a diagram showing the case where the circuit of FIG. 1 is operated is shown in FIG. 3 when the value "1" is assumed to be counted and binary data of 8 bits (0,1,0,0,1,1,0,0) are inputted to the BDATA [7:0] in the case of MODE=1. This FIG. 3 is used to described the operation of this circuit in the following.

The binary data (0,1,0,0,1,1,0,0) are read into the eight D-FFs 30 by the clock signal CLOCK in the order of 0,1,0, . . . from the above. At this time, since MODE=1, it is selected to count the number of "1s" in the data following the equation of formula 2 at the selector 20. In this case, when the value stored in the D-FF 30 is "1" the shifter corresponding to the row on the shifter array 10 converts to a shift operation and when the value stored in the D-FF 30 is "0" the shifter corresponding to the row on the shifter array 10 converts to a through operation.

Since, in FIG. 3, the value of the D-FF 30 on the top row is "0," the shifter on this row converts to a through operation. This is represented as an arrow pointing directly downward within the shifter in the figure.

Since the value of the D-FF 30 on the second row from above is "1," the operation of the shifter on the corresponding second row converts to a shift operation. This is represented as an arrow pointing downward and to the left in the Fig. This manner is applied to each of the following rows to find that the third row is a through operation, the fourth row is a through operation, the fifth row is a shift operation, the sixth row is a shift operation, the seventh row is a through operation and the last eighth row is a through operation.

As a result of the above described operations, the binary data outputted to the output S [7:0] of the shifter array 10 are as follows. That is to say, S0=1, S1=1, S2=1, S3=0, S4=0, S5=0, S6=0 and S7=0. Then the outputs D [3:0] of the encoder 40, of which the inputs are those values, are D3=0, D2=0, D1=1 and D0=1, which indicates that the value to be found in a multi-valued expression is "3." Then this value is taken in to the D-FF 50 by the next clock signal CLOCK. The DATA 0 to DATA 3 are the outputs thereof.

As described above, the binary data counting device of this embodiment does not directly operate the counting of binary data but can implement the counting processing of the number of "1" or "0" in the data expressed in a binary manner comprising N bits by multi-valuing the binary data through the usage of the encoder 40 after the binary data are gained by filling in "1" from the right so that the number of "1" or "0" which are desired to be counted in the data expressed in a binary manner comprising N bits can be encoded one to one and in an unique manner. In this case it is possible to complete the operation of the shifter array with one clock, and the circuit scale is smaller than in the full adder and, furthermore, the circuit scale is even smaller compared to the adder of multi-bits, for example of a magnitude of one several tenths.

Accordingly, compared to a prior art the embodiment can be implemented with a smaller circuit scale with the processing speed at a high speed and an inexpensive binary data counting device can be provided. In addition, it is possible to carry out a shift operation in a shorter time compared to the addition operation processing of multi-bits and, therefore, it is possible to process at a higher speed than in the circuit configuration by a network configuration of adders.

As described above, in the binary data counting process of the present invention, in the case that the number of either one of binary digits in the data expressed in a binary manner comprising N bits is counted to be converted to a multi-valued numeric expression such as a decimal number or a hexadecimal number, the counting of the number of either one of binary digits in the data expressed in a binary manner comprising N bits is not carried out through the direct operation but the counting of the number of either one of the binary digits in the data expressed in a binary manner comprising N bits is carried out as follows. That is to say, by controlling the operation of each shifter making up the shifter array with each bit value of the data expressed in a binary manner comprising N bits, binary data of N bits are outputted under the condition where one of the binary digits is filled in from one side in the same number as that of either one of the binary digits in the data expressed in a binary manner comprising N bits.

That is to say, in this binary data counting device, the data expressed in a binary manner comprising N bits work as the control signals for controlling the shift operation of the shifter array 10 in a triangle shape comprising N×(N+1)/2 shifters. In this case the shifter array 10 forms a triangle shape by arranging the shifters so as to increase by one in order from the upper side to the lower side of the bit arrangement corresponding to each bit of the data expressed in a binary manner comprising N bits, and each bit of the data expressed in a binary manner is inputted into the control input of the shifter via, for example, the selector 20.

The connections are made in the relationship where the output of the shifter on the upper side is inputted into the data inputs, which are different from each other, of the two shifters neighboring each other on the directly lower side.

At this time each shifter group corresponding to each bit of the data expressed in a binary manner remains unconnected to the different data inputs on both ends, that is, the right end of the shifter array 10 in the triangle shape and the left end corresponding to the diagonal side. On the right end of the shifter array 10 in the triangle shape a fixed input "1" is set in order for the "1" to be conveyed in a shift operation and on the left end corresponding to the diagonal side, a fixed input "0" is set in order for the "0" to be conveyed in a through operation. Then the output of the shifter on the bottom side becomes the output of the shifter array 10.

Consequently, in the case that m out of N control signals in this shifter array 10 show a shift operation, the N pieces of binary data outputted to the lower part of the shifter array 10 show m "1s" filled in from the right and the rest (N–m) show "0s."

In addition, it becomes possible to convert the above binary data into multi-valued data by the encoder 40 which converts to multi-valued data based on the position of "1" on the side of the MSB.

In the case that a means, for example the selector 20 which can selectively designate whether the shift operation of the above described shifter array 10 is carried out with "0" or with "1" is provided it then becomes possible to arbitrarily count with "0" or with "1" of the binary data.

Here, the concrete configuration of the binary data counting device is described in further detail. That is to say, this binary data counting device counts the number of either one of the binary digits in the data expressed in a binary manner comprising N bits (in this example N=8), of which the main components are N D-FFs 30, the shifter array 10, the encoder 40 and the selector 20.

The N D-FFs 30 make each bit value of the data expressed in a binary manner comprising N bits a respective input.

In the shifter array 10, N×(N+1)/2 shifters with two inputs and one output are arranged in a triangle shape of N rows with a diagonal part of the arrangement in an N×N matrix shape as an oblique side and with two side parts arranged in said matrix shape as the base and a perpendicular side, respectively, each of the outputs of N D-FFs 30 being control signals of the shifters for each row making up said triangle shape, and the outputs of the N shifters in the Nth row arranged on said base of said triangle shape being outputted as binary data of N bits.

And when two inputs of the shifter are assumed as first and second inputs, it is selected whether the first input is outputted or the second input is outputted as an output of the shifter by the control signal. And one of the binary values, for example "0" is inputted to the first input of the shifter arranged on the oblique side part in the triangle shape and an output of the shifter belonging to the oblique side part of the front row is inputted into the second inputs of the shifters from the second row to the Nth row of the oblique side part. The other binary value, for example "1" is inputted into the second input of the shifter arranged on the perpendicular side part of the triangle shape and an output of the shifter belonging to the perpendicular side part of the front row is inputted into the first inputs of the shifters from the second row to the Nth row of the perpendicular side parts. And an output of the shifter in the same column of the front row is inputted into the first input of the shifter arranged in areas other than the oblique side part or the perpendicular side part of the triangle shape and an output of the shifter arranged on the perpendicular side next to the shifter in the same column of the front row is inputted into the second input.

The encoder 40 converts the binary data of N bits outputted from the shifter array 10 into a value gained by counting the number of either one of the binary digits, for example "1" of the data expressed in a binary manner.

The selector 20 selectively designates, for counting, either one of the binary digits expressed in a binary manner comprising N bits by switching between the condition where the outputs of N D-FFs 30 are used as the control signals of the shifters without inversion and the condition where the outputs of the N D-FFs 30 are inverted to be used as the control signals of the shifters.

Accordingly, the binary data counting device of the present invention can be implemented in a very small circuit scale compared to the conventional hardware configuration in the case such that N≧32, for example, 64 bits or a bit number of more than that, and can implement the processing in one clock period and, in addition, a binary data counting device which can make the one clock period shorter can be implemented.

The arrangement of the above described triangle shape can make the area the minimum as a shifter array. Without considering the area of the arrangement, however, the connections between each of the above described components and the relationship between inputs and outputs can only be satisfied, which does not limit the shifter array to the above described triangle shape. That is to say, for the description of the circuit configuration it is only expressed as the triangle shape for convenience, of which the actual arrangement is not limited to a triangular shape.

In the following an area information sampling device and a Hough transform device to which the binary data counting device of the present invention is applied are described.

Figure 4:
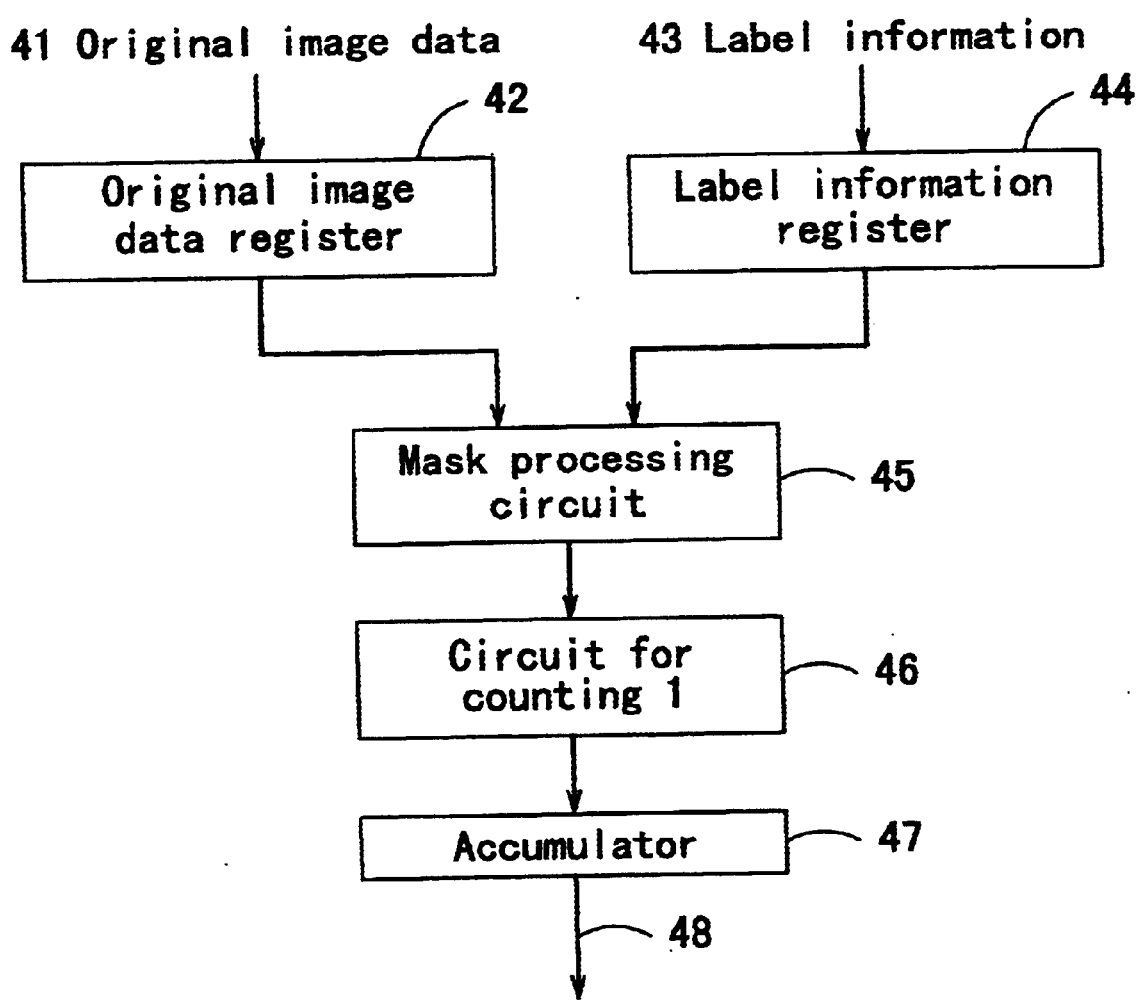
FIG. 4 is a flow chart of an area information sampling device to which a binary data counting device according to the present invention is applied.

First, an area information sampling device to which the binary data counting device of the embodiment according to the present invention is applied is described in reference to FIG. 4. In FIG. 4, the symbol 41 shows original image data. The symbol 42 shows an original image data register, and the data stored in this original image data register 42 are the data expressed in a binary manner comprising N bits, which includes data as the object of area sampling (for example, including the value of "1"). The symbol 43 shows label information. The symbol 44 shows a label information register which stores the label information 43 as a result of labeling processing of the original image data 41 and the region for carrying out area sampling can be designated as the object region by the label information 43 stored in this label information register 44. The symbol 45 shows a mask processing circuit (a logic AND processing circuit), which is a circuit for masking to "0" the value of the data in the region other than the object region designated by the label information 43 in the original image data register 42 by the information of the label information register 44. The symbol 46 shows a circuit for counting the number of "1s" of the binary data, to which the above described embodiment is applied. The symbol 47 shows an accumulator which carries out area sampling by performing accumulation processing of the output values of the circuit 46 for counting 1s. The symbol 48 is a value of the area information, which corresponds to the area for the region designated by the label information register 44. The above described is an area information sampling device to which the binary data counting device of the embodiment according to the present invention is applied.

Next, a Hough transform device, to which the binary data counting device of the embodiment according to the present invention is applied, is described with reference to FIG. 5. This Hough transform device is gained by applying the above described embodiment to a hierarchical-type Hough transform processing method as shown in the Japanese unexamined patent publication H8(1996)-263653 and a part of the logic 1 counting circuit illustrated in the processing device thereof.

Figure 5:
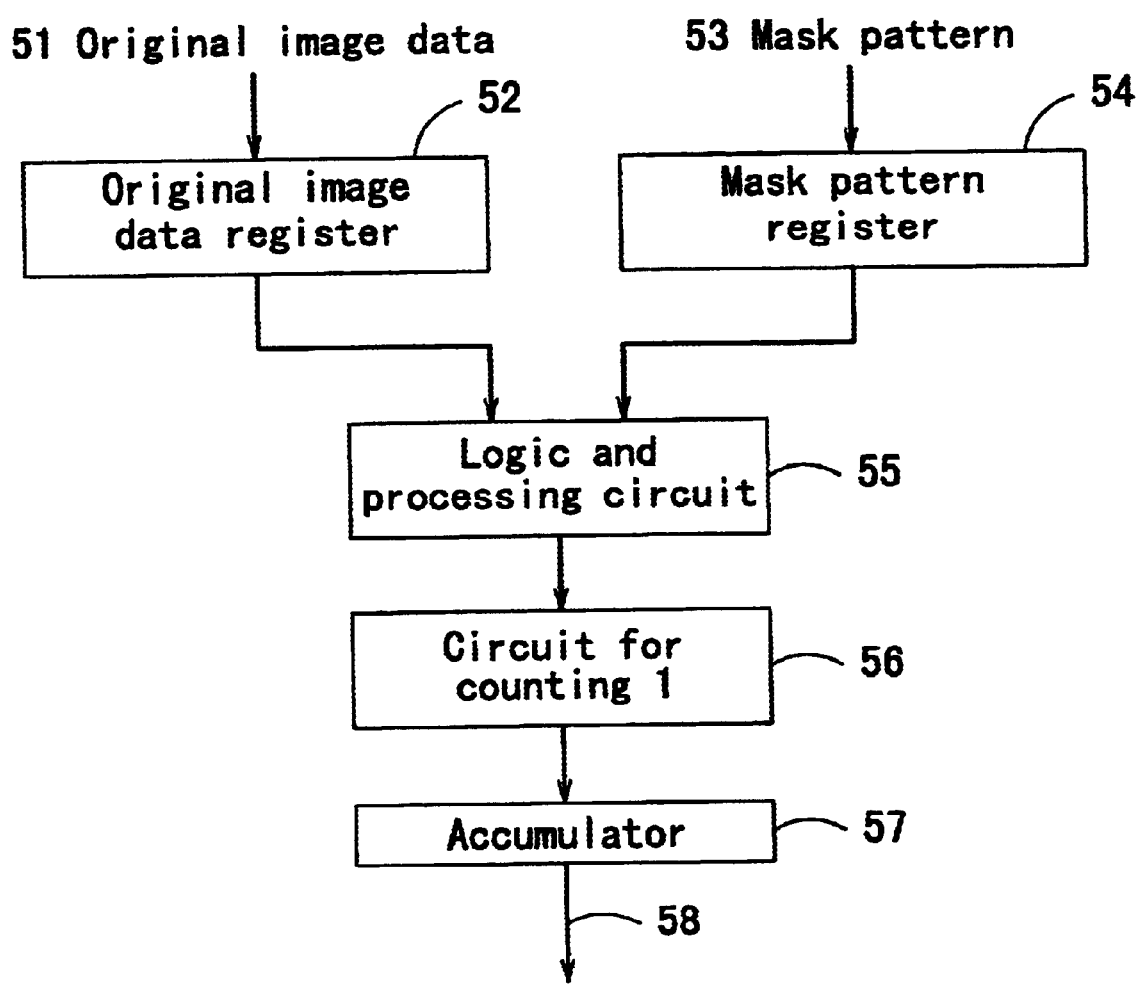
FIG. 5 is a flow chart of a Hough transform device to which a binary data counting device according to the present invention is applied.
Figure 6:
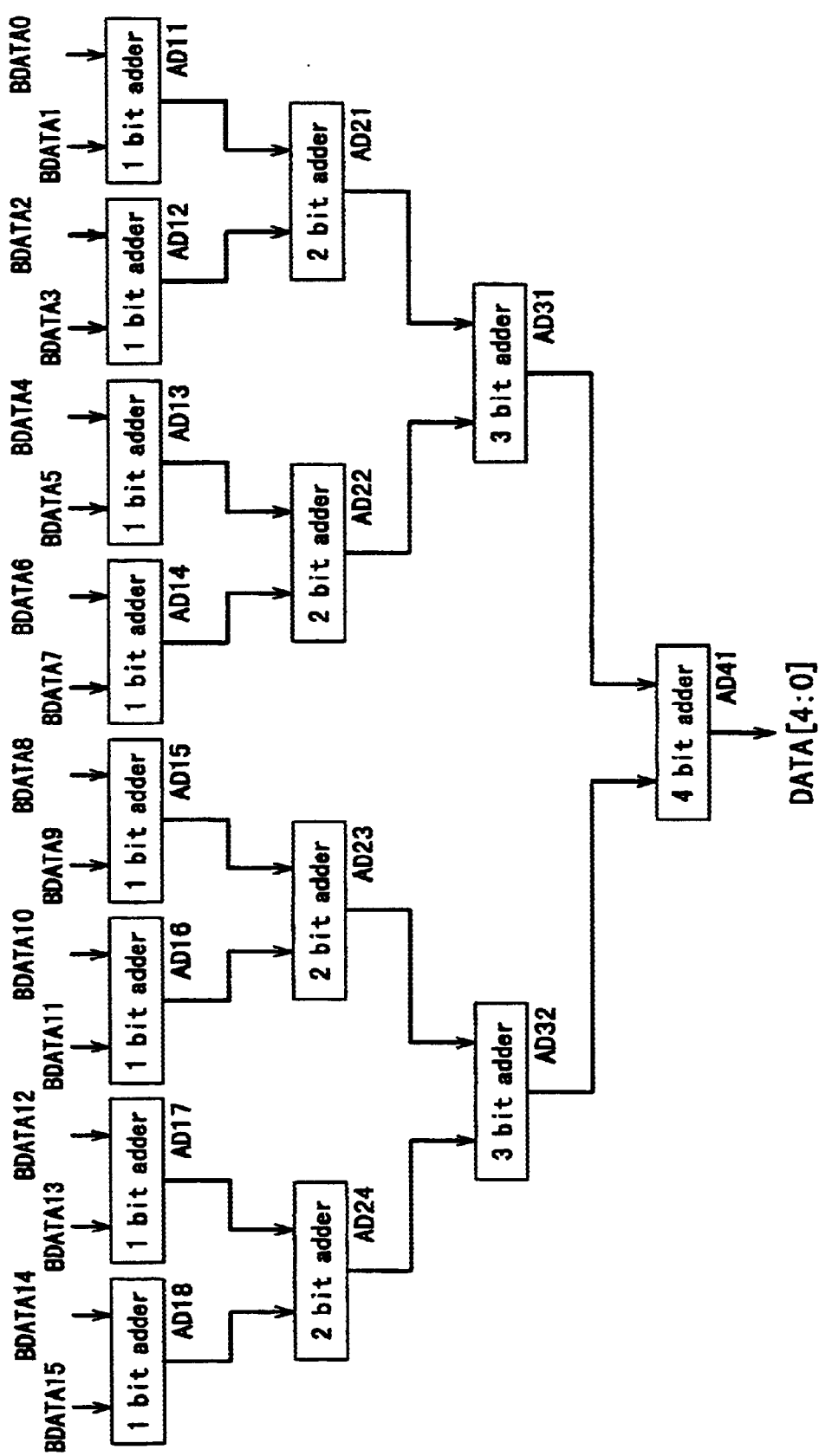
FIG. 6 is a block diagram of a binary data counting device in the case of N=16 according to a prior art.

The above described Hough transform device samples the linear component in the image, which is configured as shown in FIG. 5. In FIG. 5, the symbol 51 shows the original image data. The symbol 52 shows an original image data register. The symbol 53 shows a mask pattern. The symbol 54 shows a mask pattern register. The symbol 55 shows a logic AND processing circuit. The symbol 56 shows a circuit for counting the number of "1s" of the binary data, to which the above described binary data counting device of the embodiment is applied. The symbol 57 shows an accumulator.

In the above described configuration, an effective part as the object for Hough transform in the original image data register 52 (a Japanese hand drum shaped region on the XY plane corresponding to a predetermined rectangular region (i, j) on the SΘplane) is designated by the mask pattern register 54. More concretely, a logic AND processing is carried out between the data of the original image data register 52 and the data of the mask pattern register 54. The result of this logic AND processing becomes the data to be counted, that is, a part which is effective as the object for Hough transform, which is outputted from the logic AND processing circuit 55.

The number of "1s" in the output of this logic AND processing circuit 55 is counted in the circuit 56 for counting 1 of the binary data. Then, an accumulation processing of the output values from the circuit 56 for counting 1 is carried out by the accumulator 57. A representative value V (i, j) 58 corresponding to the effective part as the object for Hough transform is outputted from this accumulator 57. This representative value V (i, j) 58 corresponds to the number of the black pixel dots included in the Japanese hand drum shaped region in the original image data on the XY plane corresponding to the rectangular region (i, j) on the SΘplane.

What is claimed is:

1. A binary data counting device for counting the number of either one of the binary digits in data expressed in a binary manner comprising N bits, including:
   a shifter array for outputting binary data of N bits comprising N×(N+1)/2 shifters of which the control input is each bit value of said data expressed in a binary manner comprising N bits,
   wherein said binary data counting device being characterized in that said N×(N+1)/2 shifters are mutually connected so that the binary data of N bits are outputted under the condition where one of the binary digits is filled in from one side in the same number as either one of the binary digits in said data expressed in a binary manner comprising N bits by controlling the operation of each shifter making up said shifter array with each it value of said data expressed in a binary manner comprising N bits.

2. A binary data counting device according to claim 1, including an encoder which converts binary data outputted from said shifter array under the condition where one of the binary digits is filled in from one side to a multi-valued number in accordance with the position of one of said binary digits on the side of the MSB.

3. A binary data counting device according to claim 1, having a selection means which, for counting, selectively designates either one of the binary digits in said data expressed in a binary manner comprising N bits.

4. A binary data counting device for counting the number of either one of the binary digits in data expressed in a binary manner comprising N bits, including:

N flip-flops of which the inputs are each bit value of said data expressed in a binary manner comprising N bits, respectively; and a shifter array in which N×(N+1)/2 shifters with two inputs and one output are arranged in a triangle shape of N rows with a diagonal part of the arrangement in an N×N matrix shape as an oblique side and with two side parts arranged in said matrix shape as the base and a perpendicular side, respectively, each of the outputs of said N flip-flops being control signals of the shifters for each row making up said triangle shape, and the outputs of the N shifters in the Nth row arranged on said base of said triangle shape being outputted as binary data of N bits, said binary data counting device being characterized in that:

when two inputs of said shifter are assumed as first and second inputs, it is selected whether the first input is outputted or the second input is outputted as an output of said shifter by said control signal;

one of the binary values is inputted to said first input of the shifter arranged on said oblique side part in said triangle shape and an output of the shifter belonging to said oblique side part of the front row is inputted into said second inputs of the shifters from the second row to the Nth row of said oblique side part;

the other binary value is inputted into said second input of the shifter arranged on said perpendicular side part of said triangle shape and an output of the shifter belonging to said perpendicular side part of the front row is inputted into said first inputs of the shifters from the second row to the Nth row of said perpendicular side parts; and an output of the shifter in the same column of the front row is inputted into said first input of the shifter arranged in areas other than said oblique side part or said perpendicular side part of said triangle shape and an output of the shifter arranged on the perpendicular side next to the shifter in the same column of the front row is inputted into said second input.

5. A binary data counting device according to claim 4, including an encoder which converts the binary data of N bits outputted from said shifter array into a value gained by counting the number of either one of the binary digits of said data expressed in a binary manner.

6. A binary data counting device according to claim 4, having a selection means which, for counting, selectively designates either one of the binary digits in said data expressed in a binary manner comprising N bits by switching between the condition where the outputs of said N flip-flops are used without inversion as the control signals of said shifters and the condition where the outputs of said N flip-flops are inverted to be used as the control signals of the shifters.

7. An area information sampling device to which a binary data counting device according to claim 1 is applied.

8. A Hough transform device to which a binary data counting device according to claim 1 is applied.

* * * * *